UNITED STATES PATENT OFFICE.

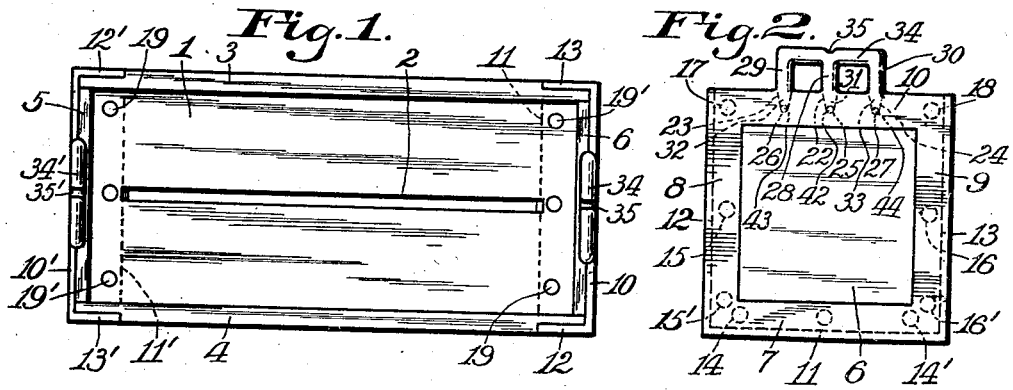
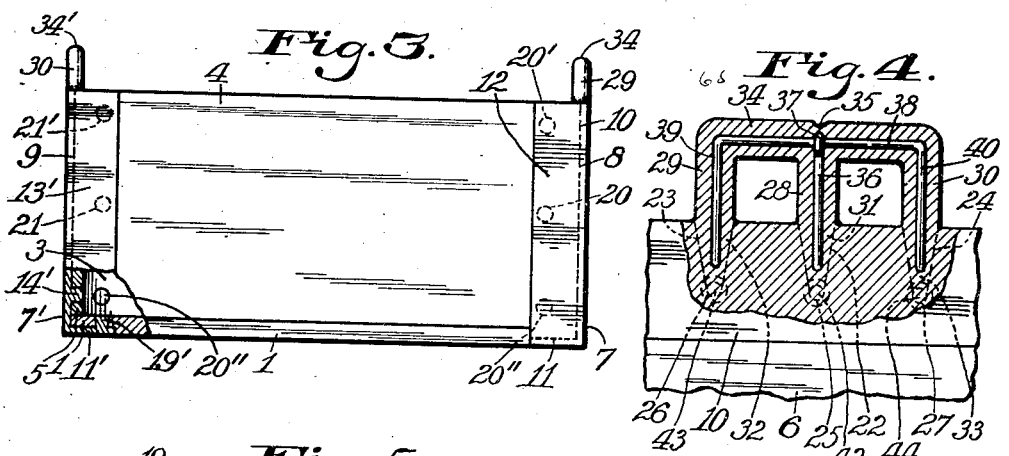
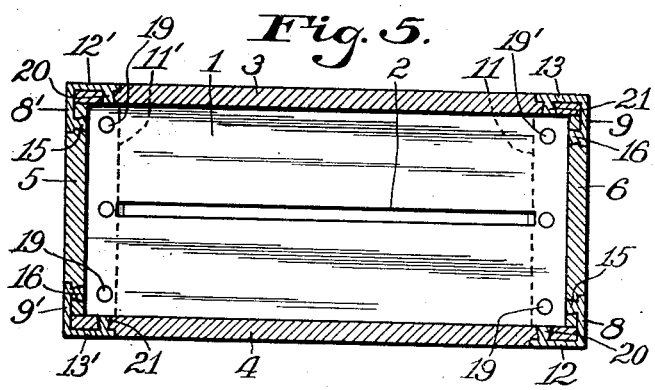
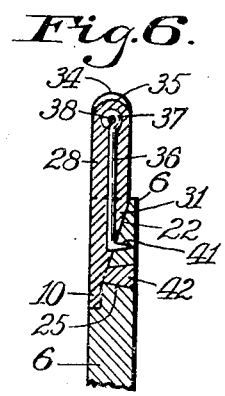
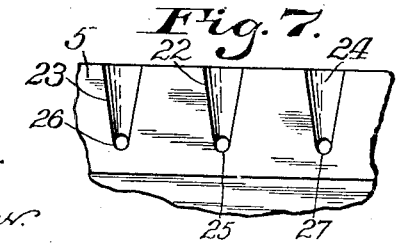

ALBERTSON HOWARD, OF INDIANAPOLIS, INDIANA, ASSIGNOR OF ONE-THIRD TO MELVIN F. LANE AND ONE-THIRD TO FLOYED T. PETERMAN, BOTH OF INDIANAPOLIS, INDIANA.

STORAGE-BATTERY CASE.

1,354,302.    Specification of Letters Patent.    Patented Sept. 28, 1920.

Application filed February 28, 1920. Serial No. 361,937.

*To all whom it may concern:*

Be it known that I, ALBERTSON HOWARD, a citizen of the United States, residing at Indianapolis, in the county of Marion and State of Indiana, have invented a new and useful Storage-Battery Case, of which the following is a specification, reference being had to the accompanying drawings and to the letters and figures of reference marked thereon.

This invention relates to a case or inclosing box and more particularly to the case of an electrical battery, especially a storage battery to be used in motor vehicles, the invention having reference more particularly to a storage battery case that is designed to be handled and in use to be firmly secured to the motor vehicle.

An object of the invention is to provide a wooden storage battery case which shall be so constructed as to be strong and durable and not be liable to rapid deterioration either in use or when being handled incidental to repairing and recharging operations, and which may be expeditiously and economically produced.

Another object is to provide a storage battery case that may be constructed of various parts, such as wooden parts, and the parts permanently and rigidly secured together so that they can not become loose.

A further object is to provide an improved storage battery case which shall have very strong handles and so connected to the case that they can not become loose or disconnected therefrom, and which shall be capable of sustaining the heavy load customarily imposed upon battery case handles.

A still further object is to provide an improved storage battery case which will permit of the case being constructed of various wooden parts rigidly secured together, and not be liable to be destructively affected by the battery elements, more especially because of leaks in battery cells.

With the above-mentioned and other objects in view, the invention consists in a case or inclosing box composed of various parts bound together by means of metal of novel form and cast to the parts of the case, and handles cast integrally with the metallic binding parts; and, the invention consists further in the parts and combinations and arrangements of parts as hereinafter particularly described and further defined in the appended claims.

Referring to the drawings,—Figure 1 is a top plan of the case or box as preferably constructed; Fig. 2 is an end elevation of the case; Fig. 3 is a side elevation of the case partially broken away; Fig. 4 is a sectional elevation showing details of the improved metallic handle on an enlarged scale; Fig. 5 is a horizontal section of the case or box; Fig. 6 is a fragmentary vertical transverse section centrally of Fig. 4; and, Fig. 7 is a fragmentary elevation showing details of the case or box minus the metallic parts.

Similar reference characters in the different figures of the drawings indicate corresponding elements or features of construction herein referred to in detail.

As practically constructed in accordance with the invention the case comprises a flat bottom 1 preferably having a longitudinal central slot 2 to permit the escape of liquid in case of leakage within the case, two vertical sides 3 and 4 and two ends 5 and 6 arranged upon the bottom. The case has two binding members to secure the different body parts together; those parts preferably being composed of wood. Each binding member is a single piece of metal preferably composed principally of lead with a suitable hardening alloy and comprises a lower face plate 7, side face plates 8 and 9 and an upper face plate 10, all integrally connected together and arranged against the outer side of the end 6 and extending over the ends of the bottom and the side members. The lower face plate 7 has a bottom angle binding plate 11 integral thereon that extends under the case bottom 1 to constitute a strong corner binding. The plate 8 similarly has a binding plate 12 that extends along the outer side of the case side 4 and the plate 9 has a binding plate 13 that extends against the outer side of the case side 3, to constitute strong corner bindings. The opposite binding member comprises face plates 7', side face plates 8' and 9' and an upper plate 10', the face plates having angle plates or flanges 11', 12' and 13', respectively, said parts being arranged in connection with the several case parts as at the other end of the case first mentioned.

The binding members may be variously secured to the wooden parts of the case, preferably by casting lugs 14, 14', on the inner side of the plates 7 and 7', similar lugs 15 and 15' on the plates 8 and 8', similar lugs 16 and 16' on the plates 9 and 9', and similar lugs 17 and 18 on the plates 10 and 10', the lugs extending through holes previously bored in the adjacent parts of the case body so as to be flush with the inner faces of the parts and to secure the plates rigidly to the parts, the end portions of the lugs preferably being relatively larger than the base portions of the lugs diametrically. Likewise the binding plates 11 and 11' have lugs 19 and 19' thereon which extend through the bottom 1; the binding plate 12 has lugs 20, 20', 20'', thereon and the plate 12' has lugs 20, 20'', and the plates 13 and 13' have similar lugs 21, 21', thereon extending through the adjacent case parts.

The upper face plates 10 and 10' have metallic handles integral therewith respectively, and preferably each end 5 and 6 has tapering grooves 22, 23 and 24, extending vertically in the outer portion thereof from which extend apertures 25, 26 and 27 respectively, to receive securing lugs or studs. Each handle comprises a central post 28 and end posts 29 and 30, the posts being integral with the upper face plates and having tapering base portions 31, 32 and 33 integral with the rear side of the face plates and extending into the grooves respectively in the ends of the case. One handle includes a horizontal cross bar 34 and the other a similar bar 34' that are integral with the posts and have notches 35 and 35' in the tops thereof, respectively, to receive a clamp device to hold the case securely in the desired position. Preferably the central post 28 of each handle has a drawn wire reinforcing rod 36 therein having an eye 37 arranged in the cross bar through which a drawn wire rod 38 extends which is embedded in the cross bar and has leg members 39 and 40 embedded in the posts 29 and 30 respectively and extending into the base portions of the posts, the lower ends of the rods having spurs 41 thereon that are driven into the adjacent end part of the case or box. The upper plates 10 and 10' have lugs 42, 43 and 44 cast thereon that extend through the apertures 25, 26 and 27 respectively to firmly secure the plates and the handles to the ends of the case body.

In the production of the case the body parts are placed uprightly as assembled within a suitable metallic box, the parts of the case body preferably having been rabbeted to receive the binding plates, the metallic box extending upward higher than the case ends and having grooves to mold the outer portions of the handles; and a collapsible core is placed within the case and extends upward above the ends of the case and has grooves adapted to mold the inner portions of the handles. Suitable metal is poured into the handle molds and it flows into the mold formed by the rabbeted portions or recesses and the metallic mold box, the metal adhering to the wood of the box resulting in the casting of the unitary binding members above described.

In practical use the case is carried by means of the handles and when used as a storage battery case, as preferred, the battery elements are arranged in the case in the usual manner and may be carefully handled in the case. The case may be secured in the usual manner on the motor vehicle body without liability of distorting or breaking the handles of the case. When carrying the case the load is supported directly on the bottom of the case and the bottom is firmly supported by the various integral portions of the binder members and the integral handles; and the tendency to break the joints caused by violently setting down the case is eliminated with the improved construction.

Having thus described the invention, what is claimed as new is—

1. A case including a plurality of parts connected together to form corners, each of the parts adjacent to each corner having lugs embedded therein and having also a binder plate on the outer side thereof and integral with the lugs, the plates on adjacent parts being integrally connected each to the other and also to the plates on the other adjacent parts of the case.

2. A case including a plurality of parts connected together to form corners, at two opposite ends of the case, and two binder members secured to the parts, each binder member having three angle portions integrally connected one to another and embracing the corners respectively, and an upper face plate integral with two of the angle portions and having an upward extending handle integral therewith.

3. A case including a plurality of parts arranged at right angles each to the other, and binder members having each a plurality of portions comprising two plates at right angles each to the other, all integrally connected one to another, the two plates of each portion being arranged on the different angles respectively of the case and having lugs integral with the plates and extending through the adjacent case parts, the end portions of the lugs being diametrically longer than the body portions of the lugs.

4. A battery case comprising a bottom and sides and ends, the upper portion of each end having vertical grooves in the outer side thereof and apertures extending from the grooves through the end, two binder members arranged on the outer side of the case ends respectively and having binder plates embracing the adjacent portions of the case bottom and sides, each member having a cross-bar extending over the grooves in the case end, the cross-bar having lugs integral therewith and extending through said apertures respectively, and a handle comprising a plurality of posts integral with the cross-bar and having base portions integral therewith and extending into said grooves respectively and integrally with the backs of the cross-bars.

5. In a storage battery case, the combination of a bottom, sides and ends on the bottom, and two binder members arranged on the outer sides of the ends respectively, each binder member comprising face plates integrally connected one to another and having each a plurality of lugs integral therewith and embedded in the adjacent one of said ends, and binder plates integral with the face plates and embracing the said bottom and sides respectively adjacent to said end and having each a plurality of lugs integral therewith and embedded in the adjacent bottom and side portions respectively.

6. In a storage battery case, the combination of a bottom, sides and ends connected one to another, each of said ends having vertical grooves in the upper portion of the outer side thereof and also apertures extending through said end, a face plate secured to said end and extending over said grooves, said plate having lugs integral therewith and extending through said apertures, and a handle comprising a plurality of posts integral with said plate and having base portions extending into said grooves respectively on the back of said plate and integral therewith, a cross-bar integral with the tops of said posts, vertical rods embedded in said posts respectively and having spurs extending into said ends, and a rod embedded in said cross-bar and connected to said vertical rod.

7. In a storage battery case, the combination with a case bottom and two sides and two ends composed of wood and connected together and to the bottom, each end with the bottom and the sides forming right-angled corners, of a pair of metallic binder members, each member being unitary and comprising a lower face plate, side face plates extending from the lower plate, and an upper face plate connected to the side plates, said plates being arranged on the outer side of one of said case ends and having each a plurality of lugs integral with the back thereof and embedded in said case end, and angle plates integral with said plates respectively, one of said angle plates extending under said bottom and having lugs integral with the back thereof and embedded in said bottom, the remaining angle plates extending onto the outer sides of said case sides respectively and having lugs integral with the backs thereof and embedded in the adjacent case sides respectively, and a handle integral with the top of said upper face plate and extending above the top of the adjacent case end.

In testimony whereof, I affix my signature in presence of two witnesses.

ALBERTSON HOWARD.

Witnesses:
E. T. SILVIUS,
F. M. ROEDER.